Jan. 2, 1934.  L. A. MOLTEN  1,941,571

HEAD LAMP SAFETY DEVICE

Filed March 3, 1932

INVENTOR
LOUIS A. MOLTEN

ATTORNEY
A. D. J. Libby

Patented Jan. 2, 1934

1,941,571

UNITED STATES PATENT OFFICE 1,941,571

HEAD LAMP SAFETY DEVICE

Louis A. Molten, Rutherford, N. J.

Application March 3, 1932. Serial No. 596,434

16 Claims. (Cl. 240—48.6)

This invention relates to an attachment to be used in connection with an automotive vehicle headlamp, and has for its principal object the provision of a device which may be readily attached to an automotive vehicle headlight for the purpose of increasing the safety of operation not only of the vehicle carrying the device, but it enhances the safety of operation of a vehicle approaching from an opposite direction.

It very frequently happens that the bulbs in automotive vehicle headlamps go out of commission either by burning out, breaking of the filament, breaking of the current-supply wires, or for some other reason. Many times these defects in headlamp illumination are not noticed by the driver of the vehicle, or if noticed, he is unable to fix the trouble either from lack of having the extra bulb with him, or lack of knowledge of how to find the trouble if the trouble is elsewhere than in the bulb. Consequently, the vehicle is driven with only one headlamp illuminated, and this is a particularly dangerous condition if it is the one toward the center of the road, as the driver of an approaching car cannot tell, for a certainty, until he is close to the vehicle carrying the defective lamp, whether it is the one nearest to the center of the road or the outside lamp that is out.

In order to give the driver of an approaching vehicle a definite indication of this headlamp trouble, I have provided an attachment to be used in connection with a headlight which will show the driver of the approaching car if the headlamp in the car he is approaching is out, and whether it is the right or left-hand one. At the same time, the device will indicate the right and left-hand sides of the car to the approaching car, whereby the driver can steer clear of the car having the defective headlamp.

Another advantage of my safety device is that a vehicle having its headlights equipped with it is more easily distinguished in a mist or fog, whether or not the main headlight bulbs are in proper working order, for the reason that the two different colored sets of lenses, to be later referred to, can be distinguished under such adverse conditions.

Other and further objects will appear from a study of the specification taken in connection with the annexed drawing wherein.

Figure 1:
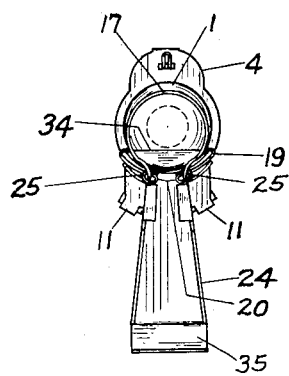
Figure 1 is a front view of the device with the safety lenses removed.

Referring now to the drawing wherein like numbers refer to corresponding parts of the various views, 1 is a lamp bulb supported by a socket 2 carried by a reflector 3 shown in broken lines.

My attachment consists of a supporting member or collar 4 having an opening therein adapted to fit around the stem of the bulb 1. As shown in the drawing, the collar 4 is held in position by a clamp made of a single piece of spring wire having two portions terminating in a loop 5 which passes through an opening 6 in the collar 4. Adjacent the stem of the lamp, the two parts of the wire clamp pass through a notch 7 and over lugs 8 disposed on opposite sides of the notch 7, and around the opposite sides of the stem of the lamp, and then pass downwardly behind a pair of lugs 9 turned inwardly from the lower portion of the collar 4. Preferably, the free ends of the wire clamp are turned upwardly at 10 whereby these ends may be more readily engaged to lift the ends of the wire clamp out of the notches 9 in order to release the bulb 1 from the collar 4 to remove the bulb for any purpose desired, or for putting the collar 4 in position.

A plurality of lugs 11, three being shown, are formed integral with the collar 4 and these lugs are provided with buffers 12 which may be of some material such as soft rubber tubing for engaging the back portion of the reflector 3.

The collar 4 also carries a support member 13 which, in the form illustrated, is made of a single piece of spring wire, the free ends of which pass through holes 14 in the collar 4 and then turn downwardly to be engaged by lugs 15 turned toward the two bottom lugs 11. The two opposite sides of the support member 13 are bent inwardly at 16 and then form a loop 17 in front of and in engagement with the bulb 1, thereby further locking the collar 4 and the bulb 1 securely together.

Figure 2:
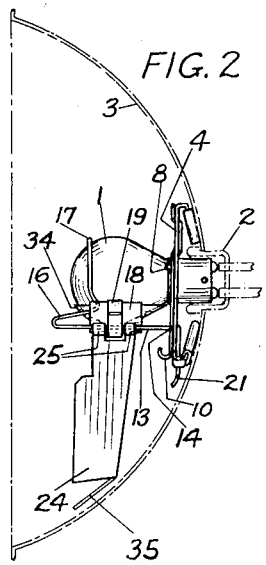
Figure 2 is a side view showing the device applied in position to an automobile headlamp.

Carried on the opposite sides of the support member 13, is a small combination reflector and deflector 18 which is preferably provided with integral lugs 19 bent downwardly and then upwardly, forming substantially a loop 20 which engages the two horizontal parts of the support member 13. The combination reflector and deflector 18 may be made in two parts, 18 and 34, fastened together in any suitable manner as shown in Figure 2, the part 34 being curved to fit the contour of the bulb 1. It is to be noted that the combination reflector and deflector is mounted in cross-head fashion on the opposite portions of the member 13, and is therefore self-aligning on the member 13 to properly position itself with respect to the bulb 1.

By releasing the ends 21 from the lugs 15, the support member 13 may be quickly removed from its normal operative position as shown in Figure 2.

The small reflector 18 has an opening 22 in the bottom portion substantially opposite the filament or filaments 23 of the bulb 1.

The support member 13 also carries a light chute 24 which is provided with a pair of clamps 25 on each side which engage the opposite sides of the wire support member 13. It will be observed that the light chute 24 may be quickly applied in position by pressing the two loop portions 16 of the member 13 toward each other, it being understood that there is plenty of room in the looped lugs to allow for this movement. After pressing the loop ends 16 toward each other and hooking the clamps 25 over the two portions thereof, the loops 16 are released and spring back into place, thereby securely holding the light chute 24 in position.

Figures 3, 4:
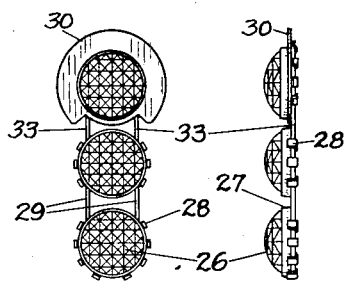
Figure 3 is a front view of the combination safety lenses of the device.
Figure 4 is a side view of Figure 3.

Cooperatively carried by the loop ends 16 and the light chute 24, is a unitary structure shown in Figures 3 and 4 which is made up of a plurality of lenses 26 carried in holders 27 that are formed with ears 28 which in turn are bent over the sides of wires 29 which also may be of two pieces looped around all three of the holders as indicated. Around the upper lens 26 is preferably positioned a light deflector 30 for a purpose to be later referred to. Preferably, the lenses 26 are made up in the usual way with a plurality of facets for dispersement of the light rays.

Figures 5, 6:
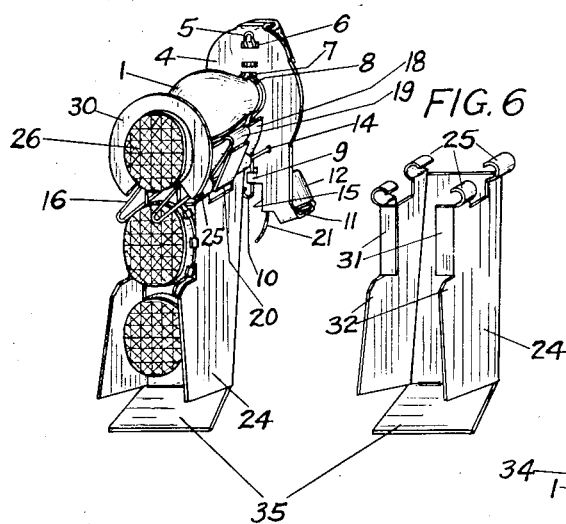
Figure 5 is a perspective view of the completely assembled device.
Figure 6 is a perspective view of one of the parts of the device.
Figure 7:
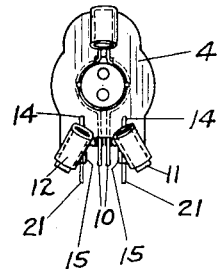
Figure 7 is a rear view of one of the mounting support members.
Figure 8:
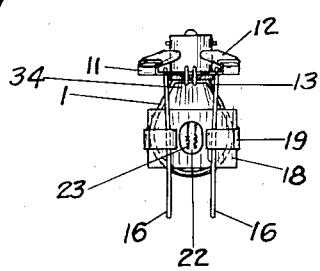
Figure 8 is a bottom view of Figure 7.

The light chute 24 has a pair of inwardly turned ledges 31 and sides 32 which project beyond the ledges 31 as indicated in Figures 5 and 6.

The unitary lens holder shown in Figures 3 and 4 is held in place between the loop ends 16 which clamp against the portions 33 when the structure of Figure 3 is pushed into position as shown in Figure 5, and the holder for the central lens engages the ledges 31, the lower lens being then in position between the projecting sides 32 as shown in Figure 5.

From what has been said, it will be understood that the various parts forming my complete attachment may be easily and quickly assembled to a standard size bulb found in an automotive vehicle.

In the application of my attachment to an automotive vehicle, I make the three lenses 26 for the left-hand lamp of the vehicle (sitting in the driver's seat) of red colored glass, while the lenses for the right-hand lamp are of green colored glass. The deflector 30 prevents direct rays from the filament of the bulb from coming out over the edges of the upper lens which would more or less blur the outlines of this lens. At the same time, the deflector turns back some of the rays against the main deflector for this to send them forward out on the road.

The small reflector 18 sends to the upper part of the main reflector 3, a certain quantity of the downwardly extending rays of the filament, but some of them pass through the opening 22 down the light chute 24 which, as indicated in Figures 2 and 5, is formed at an angle so that these light rays are reflected into the bottom and central lenses 26. Thus, when the bulb 1 is functioning to light the road, it also lights the three lenses 26 in the manner above described and this gives a red strip in the left-hand lamp and a green strip in the right-hand lamp of the vehicle, so that the two sides of the vehicle are promptly identified by an approaching car.

Should now the bulb 1 of the left-hand lamp go out of commission for any reason, the headlamps on an approaching car will light up the lenses and the operator will still be able to see where the headlight of the defective car is positioned. In fact, both the red and green lenses will be lighted up and give a true indication of the running position of the vehicle. The chances of two vehicles approaching each other with both headlamps out, are rather remote, but it is not to be supposed that a driver would operate his car with both headlamps out of commission. If the bulb 1 is of the two-filament type, either filament will give the indication above outlined.

It will be obvious that the details of construction of the attachment herein described may be varied over wide limits. Furthermore, the bottom part of the light chute 24 may be equipped with a small mirror reflector to intensify any light thrown on the lenses 26 if the car equipped with them is parked without any lights turned on. In addition, the light chute 24 may be equipped with an adjustable edge 35 which acts as a reflector to direct light rays from an approaching vehicle onto the front as well as the back of the lenses 26, whereby they will be illuminated. I may in some cases dispense entirely with the collar 4 by looping the ends of the member 13 around the stem of the bulb in a manner similar to the loop 17. The colored lenses 26 or equivalents are referred to in the claims as light-transmitting devices because they reflect the light rays as well as pass them through.

Having thus described my invention, what I claim is:

1. A safety device for a headlamp having a lighting bulb including a support member with means for attaching it to the headlamp bulb, a light chute closed along its length except on one side, carried by said support member, and colored light transmitting devices positioned in tandem over the end of the bulb and the open side of the chute, and means for directing some of the light from the bulb down said chute behind said devices.

2. A safety device for a headlamp having a lighting bulb including a support member with means for attaching it to the headlamp bulb, a light chute detachably carried by said support member, and a plurality of colored light transmitting devices arranged in tandem, one over the end of the bulb and the others in the open side of said chute.

3. A safety device for a headlamp having a lighting bulb including a support member with means for attaching it to the headlamp bulb, a light chute carried by said support member, a reflector carried by said support member adjacent the lower side of the bulb, said reflector having an opening into said chute; and a plurality of colored light transmitting devices positioned over the open side of the chute and one over the end of the bulb.

4. A safety device as set forth in claim 1, further characterized in that said device over the end of the bulb is equipped with a circular light deflector for the purpose described.

5. A safety device as set forth in claim 1, further characterized in that the colored devices are carried by a framework forming a unitary structure held in place by said support member and the chute.

6. A safety device as set forth in claim 1, in which the chute is provided at its free end with an adjustable reflector for the purpose described.

7. A safety device for a headlamp having a lighting bulb, including a plurality of colored light transmitting devices, with means for holding them to the bulb in a tandem vertical position so at least one of them is in front of the end of the bulb, means for shielding said devices on opposed sides to better give the effect of a colored strip of light for the purposes described, and a combined deflector and reflector carried by said holding means adjacent the underside of the bulb.

8. A safety device as set forth in claim 1, further characterized in that said support member is of spring wire having bent portions and a loop therebetween fitting over the end of the bulb, said bent portions serving as means for assisting in holding the colored devices in place and for releasing the chute from the support.

9. A safety device for a headlamp having a bulb including; a collar fitting over the stem of the bulb, a support member detachably fastened to said collar, a light chute detachably carried by said support member, and a unitary framework carrying a plurality of colored lenses detachably supported by said support member and the chute.

10. A safety device as set forth in claim 9 characterized in that, a combined deflector and reflector is carried on the support member and provided with an opening to allow light to pass from the bulb to said chute.

11. A safety device as set forth in claim 9 characterized in that, a combined deflector and reflector is carried on the support member and provided with an opening to allow light to pass from the bulb to said chute, further characterized in that the collar is provided with quick detachable means for removing it from the bulb stem.

12. A safety device as set forth in claim 9 characterized in that, a combined deflector and reflector is carried on the support member and provided with an opening to allow light to pass from the bulb to said chute, further characterized in that the collar is provided with quick detachable means for removing it from the bulb stem, and still further characterized in that the collar is provided with padded lugs to engage the main reflector.

13. A safety device for a headlight having a lighting bulb including; a collar to fit around the stem part of the lamp bulb, a support member carried by the collar, a combined deflector and reflector carried by said support member, a light chute having an open side also carried by said support member, said combined deflector and reflector having an opening into the chute opposite to the bulb filament, a unitary framework carried by said support member and chute, and colored light transmitting devices carried by said framework over the end of the bulb and the open side of the chute.

14. A safety device as set forth in claim 13, characterized in that the bottom of the chute is provided with an adjustable reflector and the colored light device over the end of the bulb is provided with a light deflector.

15. A safety device as set forth in claim 13, further characterized in that the collar, the support member, the chute, and unitary framework are all provided with quick detachable means whereby these parts may be quickly assembled or disassembled.

16. A safety device for a headlamp having a lighting bulb including a unitary framework structure, a plurality of colored light-transmitting devices arranged vertically in tandem on said framework so one of said devices is in front of the end of the bulb, holding means for said structure, and means for quickly attaching and detaching said unitary structure from said holding means.

LOUIS A. MOLTEN.